May 4, 1937.    C. M. GEARING    2,079,284

RETARDING MECHANISM

Filed March 12, 1935

INVENTOR:
CHARLES M. GEARING,
BY
Gales P. Moore
HIS ATTORNEY.

Patented May 4, 1937

2,079,284

UNITED STATES PATENT OFFICE 2,079,284

RETARDING MECHANISM

Charles M. Gearing, Meriden, Conn., assignor to General Motors Corporation, Detroit, Mich., a corporation of Delaware Application March 12, 1935, Serial No. 10,745

10 Claims. (Cl. 192—6)

My invention relates to retarding mechanisms, and is particularly applicable to mechanisms of that character embodied in coaster brakes. My primary object is to insure proper movability between the elements that effect the retardation. To this end, and also to improve generally upon devices of the character indicated, my invention consists in the various matters hereinafter described and claimed.

Figure 1:
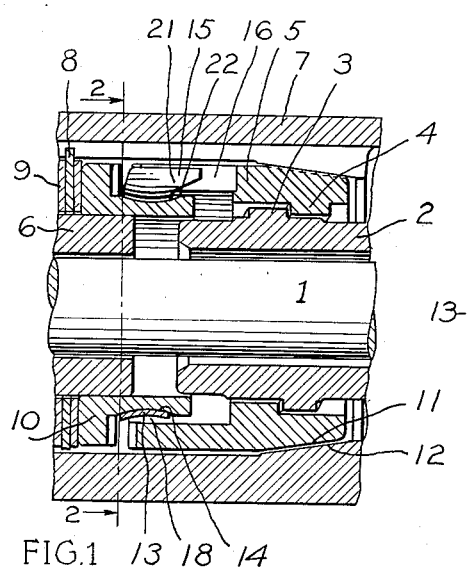
Figure 2:
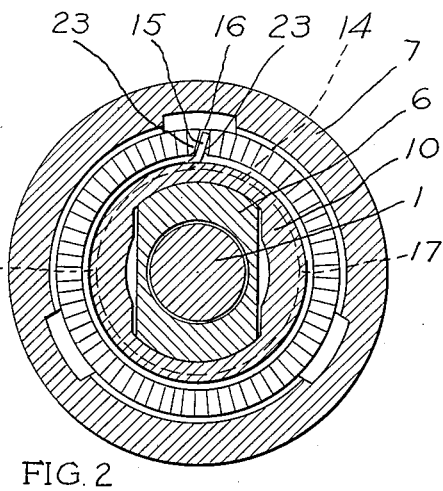
Figure 4:
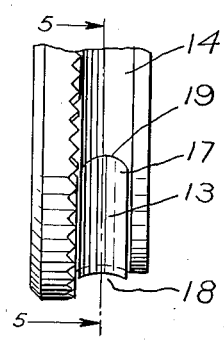
Figure 3:
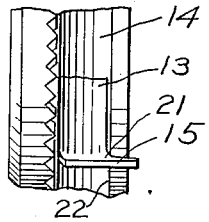
Figure 5:
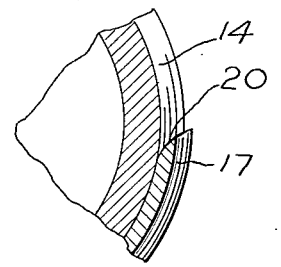

In the accompanying drawing, Figure 1 is a central, longitudinal sectional view of a portion of a coaster brake embodying my present invention; Figure 2 is a cross section on about the line 2—2 of Figure 1, looking in the direction of the arrows; Figure 3 is a fragmentary top plan view particularly illustrating what may be termed the engaging end of the retarder or lag spring; Figure 4 is a fragmentary side elevation particularly illustrating what may be termed the free end of that element; and Figure 5 is an enlarged, fragmentary cross-section on about the line 5—5 of Figure 4, looking in the direction of the arrows.

The general structure of coaster brake here illustrated is well known. It comprises a stationary axle 1 about which is rotatably supported a driver 2 which is ordinarily rigidly connected to a bicycle's usual sprocket wheel (not shown) and has coarse threads 3 intermeshing with mating threads 4 upon the nut-like, laterally-shiftable connector 5, about which and the stationary anchoring-sleeve 6 is rotatably supported the bicycle hub 7, which carries laterally-slidable brake-discs 8 that alternate with corresponding slidable but anchoring brake-discs 9 upon the anchoring-sleeve 6, the brake becoming effective when the brake-actuator 10, that is slidably but non-rotatably mounted upon the anchoring-sleeve 6, is forced to the left, as the parts are shown in Figure 1, to squeeze the brake-discs 8 and 9 together. As is well known, forward rotation of the threaded driver 2 (by the usual bicycle sprocket wheel, and counter-clockwise as the parts are shown in Figure 2) causes that driver's threads to turn within the threaded connector 5 (assuming that that connector is at that time restrained against immediate rotation with the driver) and, consequently, to move that connector to the right as the parts are shown in Figure 1 until the connector's tapering clutch-end 11 becomes firmly seated in the hub's socket 12, whereupon continued forward turning of the driver 2 causes the hub to be driven with it; should the driver 2 be held stationary (as by merely resting the feet on the bicycle pedals) momentum causes the hub 7 to continue its forward rotation, during the first of which the hub, by reason of its connection with the connector 5 at 11 and 12, causes the connector to rotate forwardly with it and thus, by reason of the threads 3 and 4, move to the left as the parts are shown in Figure 1 until the connection between hub and connector is broken; and upon backward rotation of the driver 2, if the connector 5 be restrained from similar rotation, the threads 3 and 4 cause the connector to be forced to the left as the parts are shown in Figure 1 and to thus push the brake-actuator 10 against the set of brake-discs 8 and 9 and squeeze those discs into braking relationship with each other.

To insure the desired restraint of the connector 5 against improper turning with the driver 2, it is customary to provide a contractile ring-like spring retarder or lag-device, as 13, that is received in a peripheral slot or groove, as 14, in the brake actuator 10, that lag-spring frictionally engaging such actuator and having a lug or finger, as 15, slidably received in a longitudinal slot or kerf, as 16, in the brake end of the connector, the purpose of such lag-spring being to engage the brake actuator sufficiently tightly to prevent rotation of the connector 5 at those times at which rotation of the connector is undesired, and yet to engage the brake actuator sufficiently lightly to enable the lag-spring to be rotated about the actuator when desired, as during the driving of the hub (and the bicycle of which it forms a part). It is common practice to heat-treat such lag-springs, as for tempering.

Prior to my invention such lag-springs have been of flat, straight cross-section and received in grooves having correspondingly straight bottoms and straight sides that extend perpendicularly to such bottom. But this has at times proved unsatisfactory because upon attempting to rotate the spring, as for driving, its free end, as 17, has caught upon and dug into some face of the spring-receiving slot, especially as the heat-treating of the springs has caused them to warp and twist to some extent, sometimes giving the lag-spring a generally-spiral inclination so that the constant pressure of the free spring end has been not only radially upon the bottom of the slot but also laterally against the slot's side wall. This catching and digging of the spring end into the holder 10 has resulted in interfering with the driving of the hub and has also resulted in the breaking of the spring with consequent detriment to its associated mechanism.

My present invention overcomes this difficulty. In the embodiment here illustrated although the lag spring's connector-engaging finger 15 is left flat, so that it easily operates in the kerf 16, the annular body portion of the spring is curved in cross-section, as indicated at 18, and this curvature produces a bend in the spring material that so strengthens the spring's body portion and stiffens it cross-wise as to counteract the warping and twisting tendency when the piece is subjected to heat-treating. Also, the spring-receiving groove 14 of the supporting brake-actuator 10 is correspondingly curved and somewhat wider than the spring, so that there are no abrupt confining walls with which the free end of the spring can contact, but, on the contrary, should some lateral movement occur between the spring and its support, the inclined surface of the spring merely smoothly slides radially outwardly along the correspondingly inclined surface of the groove without meeting any obstruction to the spring's rotation. The lag-spring is generally arcuate in shape for more than a half circle as seen best in Fig. 2 with its radially inner and outer surfaces substantially concentric so that the thickness is substantially uniform.

I prefer to curve the spring-end, as at 19, across its width or across what may be termed the spring's central, longitudinal axis, so that the spring-end itself presents no corners that can catch and dig into the holder, and I also preferably curve the spring-end, as at 20, from its radially inner surface to its radially outer surface, the curve 20 so being convex towards the groove 14 thereby insuring smooth travel of the spring-end along the groove surface and avoiding chance of the inner edge of the spring digging into such surface. At the neck 21 the spring projects radially beyond the top of the groove-edge 22 before the finger 15 is laterally extended, and in this way that finger wholly clears the periphery of the brake-actuator and, consequently, presents no obstruction to the spring's free rotation. Preferably the inner edges 23 of the slot 16 are bevelled, to prevent sharp corners from meeting the finger 15 and tending to break or weaken it, and I also incline the finger and its receiving-slot backwardly with respect to the direction of forward rotation of the driver 2 (and the hub 7), the result of this inclination being that in the forward rotation of the driver and connector, the sloping, rear slot-wall pushes under the backwardly-inclined finger and thereby slightly lifts it and consequently lifts the neighboring portion of the spring from the surface of the brake-actuator, thus further facilitating rotation of the spring about that brake-actuator.

Thus my present device provides a sturdy and efficient lag-spring, and a mechanism in which that spring sufficiently grips its holding-member to insure the desired retardation and yet is in such engagement with the holding-member and relationship to it that the spring can rotate about it with proper freedom when it is desired that it have such rotation.

I claim as my invention:

1. In a device of the character indicated, the combination of a rotatable driver, a driven-element, a braking element for said driven-element provided with a sloping groove, means to restrain rotation of said braking-element, a laterally-shiftable connector adapted in one lateral position to make driving connection with said driven-element and in another lateral position to operate said braking-element, there being relative rotation between said driver and said connector, means whereby relative rotation between said driver and said connector effects said lateral shifting of the latter, and a retarder of sloping cross-section in said groove and having connection with said connector; substantially as described.

2. In a device of the character indicated, the combination of a rotatable driver, a driven-element, braking-means for said driven-element, a slidable but relatively non-rotatable brake-actuator having an annular portion provided with a groove of curved cross-section, a laterally-shiftable connector adapted in one lateral position to make driving connection with said driven-element and in another lateral position to operatively slide said brake-actuator, there being relative rotation between said driver and said connector, means whereby relative rotation between said driver and said connector effects said lateral shifting of the latter, and a free-ended, ring-like lag-spring of curved-cross section in said groove, said spring having connection with said connector; substantially as described.

3. A contractile lag-element of generally arcuate form for more than a half circle to hug a groove and of substantially uniform thickness across its width, the element having an end of curved contour across said element's width; substantially as described.

4. A contractile lag-element of arcuate form having substantially concentric inner and outer faces, the element having an end of curved contour between said element's inner and outer faces and such curved end being convex towards said inner face; substantially as described.

5. In a device of the character indicated, the combination with a holding-member having a groove curved in cross-section, of an open-ended, ring-like lag-spring of curved cross-section and substantially uniform thickness seated in said groove, said spring having its free end curved across its width and also curved between its inner and outer faces with the convexity of the curve presented towards said groove; substantially as described.

6. In a device of the character described, a holder having a shallow endless groove, the groove being formed by a transversely curved surface to avoid abrupt side walls, an open spring ring concentric with the holder at the groove and having a transversely curved surface fitting in the groove and rotatable therein; substantially as described.

7. In a device of the character described, a holder having a shallow endless groove, the groove being formed by a transversely curved surface to avoid abrupt side walls, an open spring ring concentric with the holder at the groove and having a transversely curved surface fitting in the groove and rotatable therein, and the advancing end of the spring having a longitudinally convex surface adjacent to the groove; substantially as described.

8. In a device of the character described, a holder having a shallow endless groove, the groove being formed by a transversely curved surface to avoid abrupt side walls, an open spring ring concentric with the holder at the groove and having a transversely curved surface fitting in the groove and rotatable therein, the advancing end of the spring being convex across its width; substantially as described.

9. In a device of the character described, a holder having a shallow endless groove, the groove being formed by a transversely curved surface to avoid abrupt side walls, an open spring ring concentric with the holder at the groove and having a transversely curved surface fitting in the groove and rotatable therein, the advancing end of the spring being convex across its width and convex longitudinally adjacent to the groove; substantially as described.

10. In a device of the character described, a holder and a member adapted to have relative rotation, one of said parts having a shallow endless groove formed by a transversely arcuate surface, and a retarder interposed between the holder and the member and keyed to one of them, the retarder comprising a spring ring of concavo-convex cross section having its convex surface fitting in said groove; substantially as described.

CHARLES M. GEARING.